US006975357B1

(12) United States Patent
Suzuki et al.

(10) Patent No.: US 6,975,357 B1
(45) Date of Patent: *Dec. 13, 2005

(54) SOLID-STATE IMAGING PICKUP DEVICE WITH VERTICAL AND HORIZONTAL DRIVING MEANS FOR A UNIT PIXEL

(75) Inventors: Ryoji Suzuki, Tokyo (JP); Takahisa Ueno, Tokyo (JP); Koichi Shiono, Tokyo (JP); Kazuya Yonemoto, Tokyo (JP)

(73) Assignee: Sony Corporation, (JP)

( * ) Notice: Subject to any disclaimer, the term of this patent is extended or adjusted under 35 U.S.C. 154(b) by 916 days.

This patent is subject to a terminal disclaimer.

(21) Appl. No.: 09/830,515

(22) PCT Filed: Aug. 28, 2000

(86) PCT No.: PCT/JP00/05783

§ 371 (c)(1),
(2), (4) Date: Aug. 3, 2001

(87) PCT Pub. No.: WO01/17234

PCT Pub. Date: Mar. 8, 2001

(30) Foreign Application Priority Data

Nov. 22, 1999 (JP) .................................. 11-331685

(51) Int. Cl.$^7$ ........................................... H04N 5/335
(52) U.S. Cl. ..................... 348/308; 348/294; 348/310; 250/208.1
(58) Field of Search ................................ 348/294, 297, 348/301–304, 307–310; 250/208.1

(56) References Cited

U.S. PATENT DOCUMENTS

| 4,603,355 | A | | 7/1986 | Yamada et al. ............. 358/213 |
|---|---|---|---|---|
| 4,835,617 | A | * | 5/1989 | Todaka et al. .............. 348/296 |
| 4,974,093 | A | | 11/1990 | Murayama ............. 358/213.19 |
| 5,471,515 | A | * | 11/1995 | Fossum et al. ................ 377/60 |
| 6,037,577 | A | * | 3/2000 | Tanaka et al. ........... 250/208.1 |
| 6,115,065 | A | * | 9/2000 | Yadid-Pecht et al. ....... 348/308 |
| 6,674,470 | B1 | * | 1/2004 | Tanaka et al. .............. 348/302 |
| 6,798,451 | B1 | * | 9/2004 | Suzuki et al. ............... 348/294 |
| 6,801,253 | B1 | * | 10/2004 | Yonemoto et al. .......... 348/241 |
| 6,801,256 | B1 | * | 10/2004 | Egawa et al. ............... 348/294 |

FOREIGN PATENT DOCUMENTS

GB      2 329 959      4/1999

* cited by examiner

Primary Examiner—Ngoc-Yen Vu
Assistant Examiner—Carramah J. Quiett
(74) Attorney, Agent, or Firm—Rader, Fishman & Grauer PLLC; Ronald P. Kananen

(57) ABSTRACT

In a CMOS image pickup device in which the signal corresponding to the accumulated charge amount of each pixel is output to horizontal signal lines wired on a row basis, for example, two vertical selection transistors are provided for every horizontal signal lines, and two vertical signal lines and two vertical scan circuits are provided for every horizontal signal line, thereby separately outputting signals which are different in accumulation time and obtained by arbitrarily dividing 1 field into any number of parts on the basis of integer times of 1H.

13 Claims, 8 Drawing Sheets

SOLID-STATE IMAGING PICKUP DEVICE WITH VERTICAL AND HORIZONTAL DRIVING MEANS FOR A UNIT PIXEL

TECHNICAL FIELD

The present invention relates to a solid-state image pickup device, a method of driving the solid-state image pickup device and a camera system, and particularly to an X-Y address type solid-state image pickup device, a method of driving the solid-state image pickup device, and a camera system using the solid-state image pickup device as an image pickup device.

BACKGROUND ART

With an X-Y address type solid-state image pickup device such as a CMOS image pickup device or the like, an output signal which is substantially linearly proportional to the amount of charges accumulated in each unit pixel through photoelectric conversion is obtained, and the dynamic range of the image pickup device is determined by the amount of charges which can be accumulated in each unit pixel.

FIG. 13 is an input/output characteristic diagram showing the relationship between the amount of light incident to an image pickup device and the output signal amount thereof. Apparent from the input/output characteristic diagram, the dynamic range of the image pickup device is determined by the saturated signal amount of each pixel and the noise level.

As described above, the charge amount which can be accumulated in the unit pixel is restricted due to the size of the pixel. Therefore, if the diaphragm of a camera lens is matched with a subject having low brightness in a camera system using this type of X-Y address type solid-state image pickup device as an image pickup device, the signal of a subject having high brightness is saturated. On the other hand, if the diaphragm of the camera lens is matched with a subject having high brightness, the signal of a subject having low brightness is embedded in noises, so that a broad dynamic range required for image recognition, etc. cannot be obtained.

Therefore, there has been proposed an X-Y address type solid-state image pickup device which can implement a broad dynamic range image pickup operation by outputting both of a long-time accumulated signal and a short-time accumulated signal during one field or one frame and obtaining an image pickup signal having contrast to an incident light amount in a very broad range on the basis of the long-time and short-time accumulated signals. Here, the long-time accumulated signal is a signal based on signal charges which are accumulated for a long time, and the short-time accumulated signal is a signal based on signal charges which are accumulated for a short time.

In the conventional X-Y address type solid-state image pickup device, the long-time accumulated signal of one line is output and then the short-time accumulate signal of one line is output. Therefore, a vertical read-out scan pulse rises up during a horizontal picture period or a horizontal scan circuit carries out a scanning operation twice during one horizontal scan period, which leaks into a camera signal processing circuit and appears as a vertically-striped system noise in the vicinity of the center portion of the screen.

Further, the long-time accumulated signal and the short-time accumulated signal are output from a single output terminal through a common signal line during the same horizontal scanning period, and thus the output signal frequency is increased substantially twice for an image pickup device which does not carry out the broad dynamic range image pickup operation. Therefore, the power consumption is increased and the SN ratio is deteriorated.

DISCLOSURE OF INVENTION

The present invention has been implemented in view of the foregoing situation, and has an object to provide a solid-state image pickup device which can eliminate the vertically-striped system noise in principle and prevent increase of the power consumption and deterioration of the SN ratio, a method of driving the solid-state image pickup device and a camera system using the solid-state image pickup device.

According to the solid-state image pickup device of the present invention, horizontal signal lines of plural rows are wired on a row basis in a pixel portion where unit pixels are arranged in a matrix form, and plural vertical signal lines are wired commonly to these horizontal signal lines of plural rows. The solid-stage image pickup device of the present invention is equipped with multiple-system vertical driving means which select each pixel of the pixel portion on a row basis over plural different rows and successively outputting to plural vertical signal lines signals which are output from the respective pixels to horizontal signal lines of plural rows, and horizontal driving means for successively selecting the respective pixels of plural rows which are selected by the vertical driving means. Further, the camera system of the present invention uses the solid-state image pickup device thus constructed as an image pickup device.

There has been considered such a construction that two vertical signal lines are provided and a dual system of vertical driving means is provided in connection with the two vertical signal lines. In this construction, signals of two different columns are output through the two vertical signal lines at the same time. At this time, a long-time accumulated signal and a short-time accumulated signal are output as dual system signals at the same time by making the accumulation time of signal charges different between the respective pixels of the different two lines. In a camera system using this solid-state image pickup device as an image pickup device, coincidence (simultaneity) processing is carried out to set the long-time accumulated signal and the short-time accumulated signal to signals on the same line, and then operating processing is carried out to implement a broad dynamic range image pickup operation.

BEST MODE FOR CARRYING OUT THE INVENTION

Preferred embodiments according to the present invention will be described in detail hereunder with reference to the accompanying drawings by using a case where the present invention is applied to an X-Y address type solid-state image pickup device, for example, a CMOS image pickup device.

Figure 1:
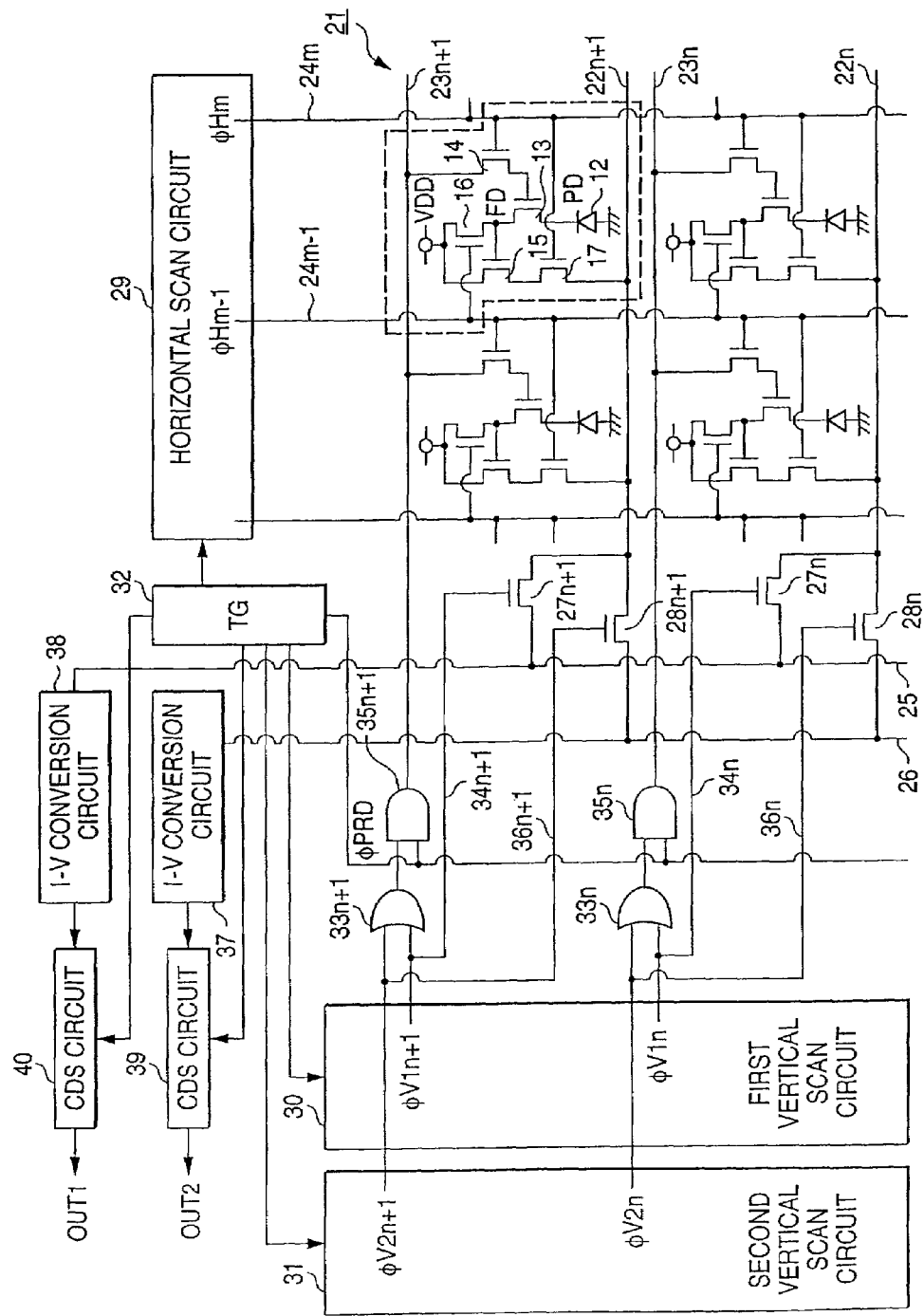
FIG. 1 is a diagram showing the construction of a CMOS image pickup device according to an embodiment of the present invention.

FIG. 1 is a diagram showing the construction of a CMOS image pickup device according to an embodiment of the present invention.

In FIG. 1, an area surrounded by a broken line indicates an unit pixel 11. The unit pixel 11 includes five NchMOS transistors of a read-out transistor 13, a read-out selection transistor 14, an amplifying transistor 15, a reset transistor 16 and an output selection transistor 17 for a photodiode (PD) 12 serving as a photoelectric conversion element. A plurality of unit pixels 11 as described above are arranged in a matrix form to form a pixel portion 21.

In this case, in order to simplify the drawings, the pixel portion 21 is illustrated as being constructed in a pixel structure having two columns ((m−1)-th column, m-th column) and two rows (n-th row, (n+1)-th row). In the pixel portion 21, horizontal signal lines $22n+1$, $22n$ and read-out lines $23n+1$, $23n$ are wired on a row basis. Further, horizontal selection lines $24m−1$, $24m$ are wired on a column basis.

In the unit pixel 11 on m-th column and (n+1)-th row, the photodiode 12 serves at both of a photoelectric conversion function and a charge accumulating function. That is, the photodiode 12 serves to photoelectrically convert incident light to a signal charge having the charge amount corresponding to the light amount of the incident light, and further accumulate the signal charge thus converted. The photodiode 12 is designed in a diode-buried type sensor structure, for example, in an HAD (Hole Accumulated Diode) sensor structure in which a hole accumulated layer formed of p+ layer is added at the substrate surface side of an np diode.

The source of a read-out transistor 13 is connected to the cathode of the photodiode 12. The drain of the read-out transistor 13 is connected to a floated diffusion area FD serving as an accumulating portion, and the gate thereof is connected to the source/drain of a read-out selection transistor 14. In the read-out selection transistor 14, the drain/source thereof is connected to a read-out line $23n+1$, and the gate thereof is connected a horizontal selection line $24m$. In an amplifying transistor 15, the gate thereof is connected to the floated diffusion area FD, and the drain thereof is connected to a power source VDD.

In a reset transistor 16, the source thereof is connected to the floated diffusion area FD, the drain thereof is connected to the power source VDD, and the gate thereof is connected to the adjacent horizontal signal line $24m−1$ of (m−1)-th column. The reset transistor 16 is designed as a depression type to reset the floated diffusion area FD to the power source VDD. In an output selection transistor 17, the drain thereof is connected to the source of the amplifying transistor 15, the source thereof is connected to a horizontal signal line $22n+1$, and the gate thereof is connected to a horizontal selection line $24m$.

In connection with horizontal signal lines of plural rows (in this case, the horizontal signal lines $22n$, $22n+1$ of two rows), first and second vertical signal lines 25, 26 are wired in an area out of the pixel portion 21 so as to be perpendicular to the horizontal signal lines $22n$, $22n+1$. Vertical selection transistors $27n$, $27n+1$ and $28n$, $28n+1$ are connected between each of the horizontal signal lines $22n$, $22n+1$ and the first, second vertical signal lines 25, 26. These vertical selection transistors $27n$, $27n+1$, $28n$, $28n+1$ are also formed of NchMOS transistors.

On the peripheral portion of the pixel portion 21 are provided a horizontal scan circuit 29 for column selection as a horizontal driving system, and both of a first vertical scan circuit 30 for row selection and a second vertical scan circuit 31 for controlling the accumulation time which serve as a vertical driving system. These scan circuits 29, 30 and 31 are formed of shift transistors, for example, and start a shift operation (scan) in response to a driving pulse given from a timing generator (TG) 32.

Horizontal scan (selection) pulses φHm−1, φHm are successively output from the horizontal scan circuit 29. These horizontal scan pulses φHm−1, φHm are supplied through the horizontal selection lines $24m−1$, $24m$ to each gate of the read-out selection transistor 14, the reset transistor 16 and the output selection transistor 17 of the unit pixel 11 on a column basis. First vertical scan pulses φV1$n$, φV1$n+1$ are successively output from the first vertical scan circuit 30, and second vertical scan pulses φV2$n$, φV2$n+1$ are successively output from the second vertical scan circuit 31.

The first vertical scan pulses φV1$n$, φV1$n+1$ are input to one of OR gates $33n$, $33n+1$ every row, and also supplied to the gates of the vertical selection transistors $27n$, $27n+1$ through the vertical selection lines $34n$, $34n+1$. The second vertical scan pulses φV2$n$, φV2$n+1$ are input to the other of the OR gates $33n$, $33n+1$ every row, and supplied to the gates of the vertical selection transistors $28n$, $28n+1$ through the vertical selection lines $36n$, $36n+1$.

The respective outputs of the OR gates $33n$, $33n+1$ are input to respective one input terminals of AND gates $35n$, $35n+1$, and a read-out pulse φPRD output from the timing generator 32 is input to the other input terminals of the AND gates $35n$, $35n+1$. Each output of the AND gates $35n$, $35n+1$ is supplied through the read-out line $23n$, $23n+1$ to the drain of the read-out selection transistor 14 in each pixel.

I(current)-V(voltage) conversion circuits 37, 38 for converting signal current to signal voltage and correlated double sampling circuits (hereinafter referred to as CDS) 39, 40 as differential circuits are provided at the output end sides of the first and second vertical signal lines 25, 26. The I-V conversion circuits 37, 38 convert to a signal voltage a pixel signal which is supplied as signal current through the vertical signal lines 25, 26 and then supply the signal voltage to CDS circuits 39, 40.

The CDS circuits 39, 40 perform processing of taking the difference between the noise level and the signal level just after pixel reset on the basis of the sampling pulse supplied from the timing generator 32. If necessary, an AGC (Auto Gain Control) circuit, an ADC (Analog Digital Converter) circuit, etc. may be provided at the subsequent stage of each of the CDS circuits 39, 40.

Next, the broad dynamic range operation in the CMOS image pickup device according to the embodiment of the present invention will be described with reference to the timing charts of FIGS. 2 and 3.

Figure 2:
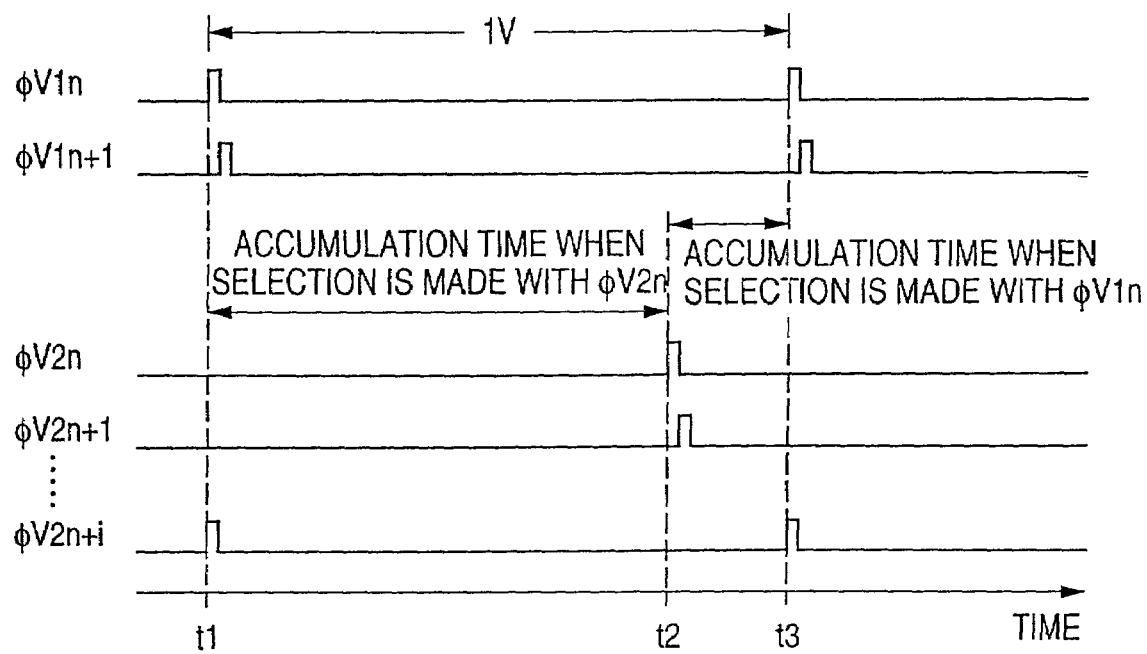
FIG. 2 is a timing chart of a vertical scan operation.
Figure 3:
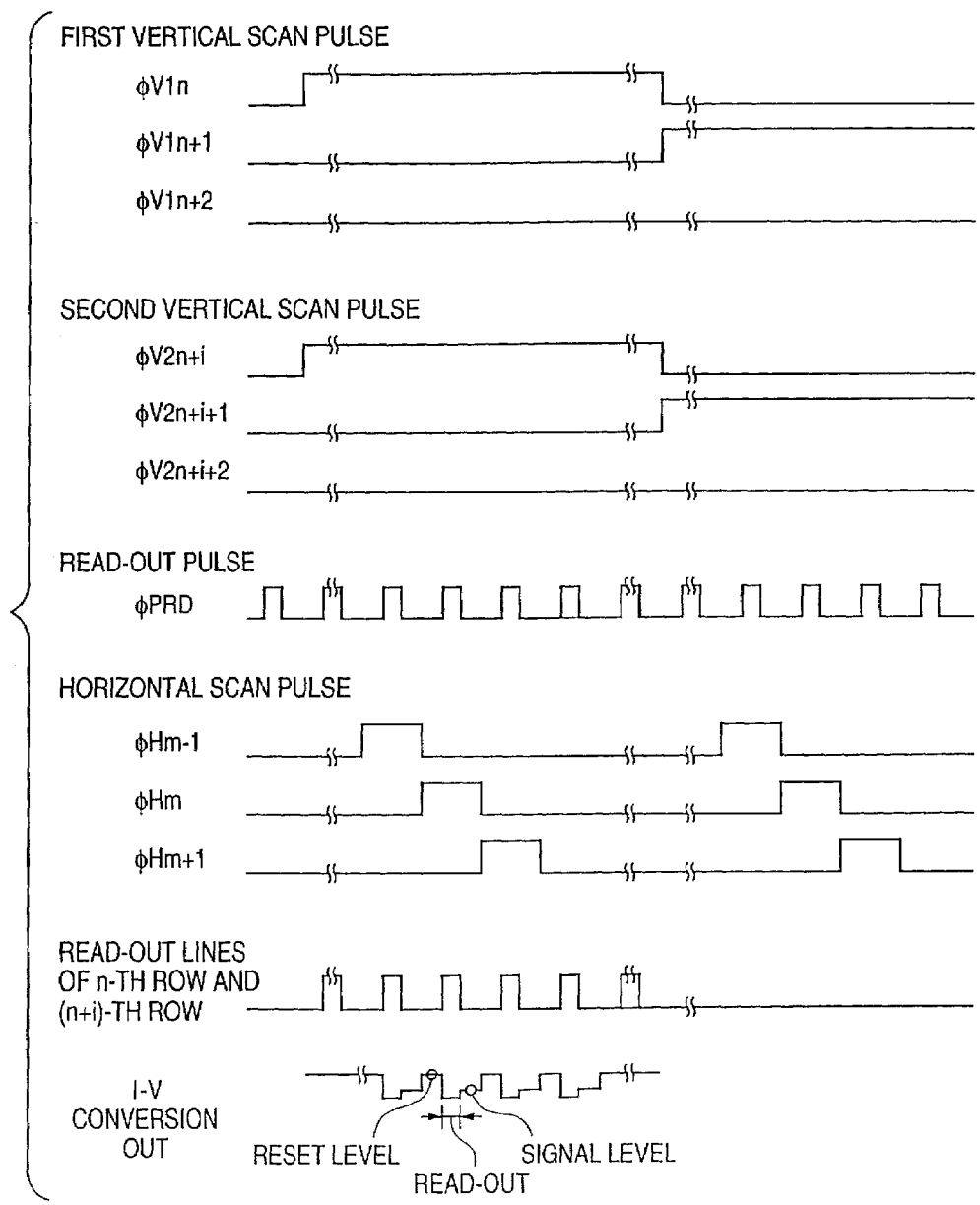
FIG. 3 is a timing chart of a horizontal scan operation.

FIG. 2 is a timing chart of the vertical scan operation, and FIG. 3 is a timing chart of the horizontal scan operation.

The first vertical scan pulse φV1n and the second vertical scan pulse φV2n+i are output from the first vertical scan circuit 30 and the second vertical scan circuit 31 respectively at a time t1 by the vertical scan operation of the first and second vertical scan circuits 30, 31. The first vertical scan pulse φV1n is applied through the vertical selection line 34n to the gate of the vertical selection transistor 27n on the n-th row, and the second vertical scan pulse φV2n+i is applied through the vertical selection line 36n+i to the gate of the vertical selection transistor 28n+i on the (n+i)-th row. As a result, the n-th row, the (n+i)-th row are selected.

Under this state, the horizontal scan operation is carried out by the horizontal scan circuit 29. The horizontal scan operation will be described by paying attention to the m-th column, for example.

First, when the horizontal scan pulse φHm−1 is output from the horizontal scan circuit 29 and applied to a horizontal selection line 24m−1 on the (m−1)-th column, the reset transistor 16 of the pixel of the m-th column is set to ON state, whereby the floated diffusion area FD is reset to the power source VDD through the reset transistor 16.

Subsequently, when the horizontal scan pulse φHm is output from the horizontal scan circuit 29 and applied to the horizontal selection line 24m of the m-th column, the output selection transistor 17 of the pixel on the m-th column is set to ON state, whereby the current corresponding to the reset level of the pixel (m,n) on the vertically selected n-th row and the horizontally selected m-th column is output through the horizontal signal line 22n and the vertical selection transistor 27n to the first vertical signal line 25, and at the same time the current corresponding to the reset level of the pixel (m,n+i) on the vertically selected (n+i)-th row and the horizontally selected m-th column is output to the second vertical signal line 26 through the horizontal signal line 22n+i and the vertical selection transistor 28n+i.

When the read-out pulse φPRD is output during an occurrence period of the horizontal scan pulse φHm, the logical product is taken between the read-out pulse φPRD and the first vertical scan pulse φV1n in the AND gate 35n, and also between the read-out pulse φPRD and the second vertical scan pulse φV2n+i in the AND gate 35n+i. As a result, pulses rise up on the read-out lines 23n, 23n+i of the n-th and (n+i)-th rows, respectively. At this time, each of the read-out selection transistors 14 at the pixels (m,n), (m,n+i) is set to ON state because the horizontal scan pulse φHm is applied to the gate thereof.

Accordingly, the read-out pulse φPRD applied to the read-out lines 23n, 23n+i is applied to the gate of the read-out transistor 13 through the drain/source of the read-out selection transistor 14 at the pixels (m,n), (m,n+i), whereby the read-out transistor 13 is set to ON state, and the signal charges which are produced and accumulated through the photoelectric conversion in the photodiode 12 are read out to the floated diffusion area FD through the read-out transistor 13.

Figure 4:
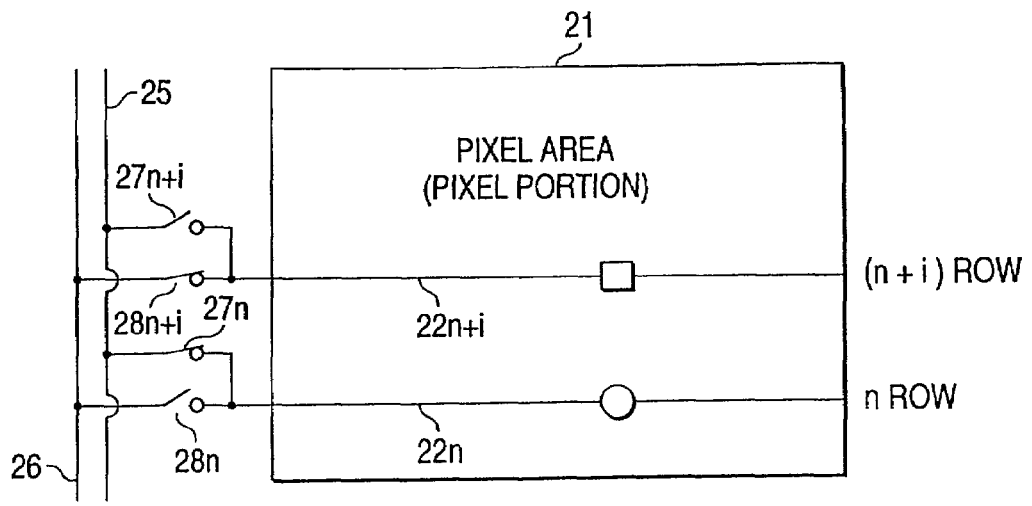
FIG. 4 is a schematic diagram showing the vertical scan operation in a broad dynamic range operation.

When the read-out pulse φPRD is extinguished, the read-out transistor 13 is set to OFF state. The signal charges read into the floated diffusion area FD are amplified in accordance with the charge amount thereof by the amplifying transistor 15 and set to signal current, and then output through the output selection transistor 17 and then the horizontal signal lines 22n, 22n+i and the vertical selection transistors 27n, 28n+i (as shown in FIG. 4) to the first and second vertical signal lines 25, 26, respectively.

When the pixels (m,n), (m,n+i) are selected, the pixels (m+1, n), (m+1, n+i) of the next column are reset by the horizontal scan pulse φHm. When the horizontal scan pulse φHm is extinguished and the horizontal scan pulse φHm+1 is output from the horizontal scan circuit 29, the pixels (m+1,n), (m+1, n+i) on the next column are set to be selected.

By repeating the above series of operations, the reset level and the signal level of the unit pixels 11 of one line of the n-th row, and the reset level and the signal level of the unit pixels 11 of one line of the (n+i)-th row are successively read out through the same passage (the horizontal signal line 22n, the vertical selection transistor 27n, 28n+i or the like) onto the first and second vertical signal lines 25, 26, respectively. These signal levels are converted from current to voltage in the I-V conversion circuits 37, 38, and then supplied to the CDS circuits 39, 40 to be subjected to noise cancel through correlated double sampling.

Subsequently, the second vertical scan pulse φV2n is output from the scan circuit 31 at a time t2 through the vertical scan operation of the second vertical scan circuit 31. The second vertical scan pulse φV2n is applied to the gate of the vertical selection transistor 28n of the n-th row through the vertical selection line 36n. As a result, the n-th row is selected. Each pixel on the n-th row is selected at the time t1 by the vertical scan operation of the first vertical scan circuit 30, and the photodiode 12 is reset.

Accordingly, the signal corresponding to the charge amount of charges which are photoelectrically converted and accumulated in the photodiode 12 for the accumulation time of t2−t1 (that is, a long-time accumulation signal) at each pixel of the n-th row is output as an output OUT 2 through the horizontal signal line 22n of the n-th row through the vertical selection transistor 28n through the second vertical signal line 26. Since the signal is also read out from the photodiode 12 at this time point, the photodiode 12 is reset.

Again, the first vertical scan pulse φV1n is output from the scan circuit 30 at the time t3 after one vertical scan period (1V) elapses from the time t1 by the vertical scan operation of the first vertical scan circuit 30. The first vertical scan pulse φV1n is applied to the gate of the vertical selection transistor 27n of the n-th row through the vertical selection line 34n. As a result, the n-th row is selected. Each pixel on the n-th row is selected at the time t2 by the vertical scan operation of the second vertical scan circuit 31, and the photodiode 12 is reset.

Accordingly, in each pixel of the n-th row, the signal corresponding to the charge amount of charges which are photoelectrically converted and accumulated for the accumulation time of t3−t2 (that is, a short-time accumulation signal) in the photodiode 12 is output as an output OUT 1 through the horizontal signal line 22n of the n-th row through the vertical selection transistor 27n through the first vertical signal line 26.

Figure 5:
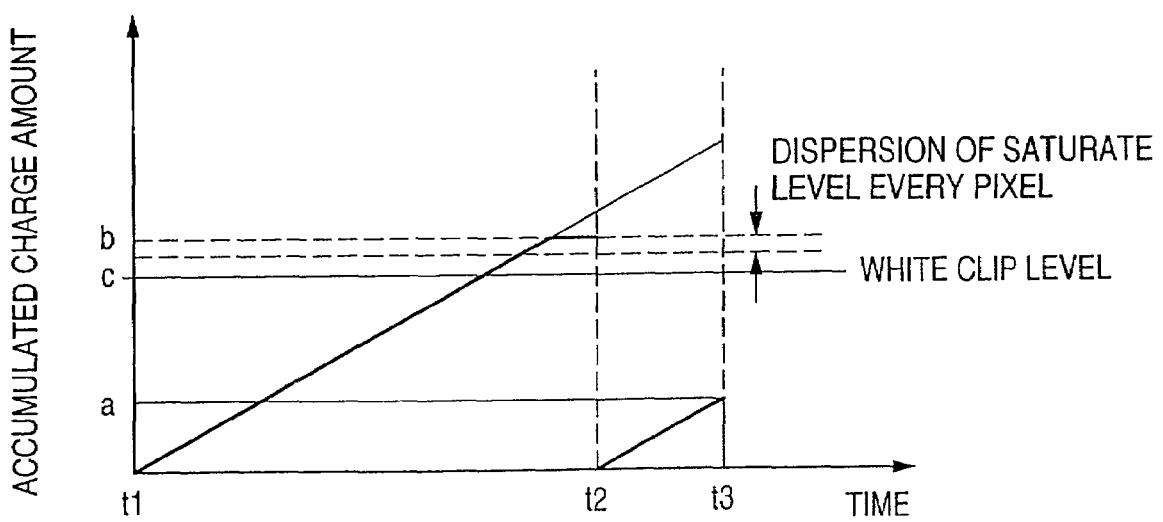
FIG. 5 is a diagram showing the time variation of a pixel accumulated charge amount in the broad dynamic range operation.

FIG. 5 shows the time variation of the accumulated charge amount of a pixel in which the photodiode 12 is saturated in a normal read-out operation. In FIG. 5, a represents the signal level, b represents the saturation level, and c represents the white clip level. The saturation level b is dispersed among pixels.

A pixel which starts the charge accumulation at the time t1 reaches the saturation level at the time t2, and the saturation level b is output as an output OUT2. At the time t3, the signal level a corresponding to the accumulation time of t3–t2 is output as an output OUT1 from the pixel at the time t3. Here, if the timing is set so as to satisfy the condition: (t3–t2)<(t2–t1), a pixel which is saturated at (t2–t1) is not saturated at (t3–t2).

Through a series of operations as described above, the long-time accumulation signal (saturation level b) and the short-time accumulation signal (signal level a) are output as the output OUT2 and the output OUT1 respectively from the same pixel with the time lag of (t3–t2)

As described above, in the CMOS image pickup device in which the signal corresponding to the accumulation charge amount of each pixel is output to the horizontal signal lines 22n, 22n+1 arranged on a row basis, for example, two vertical selection transistors 27n, 28n, two vertical signal lines 25, 26 and two vertical scan circuits 30, 31 are arranged for each horizontal signal line, thereby outputting signals which are different in accumulation time and obtained by dividing 1 field into any number of parts with any integer times of 1H (H represents the horizontal scan period), that is, the long-time accumulation signal and the short-time accumulation signal.

Accordingly, the driving frequency of the CMOS image pickup device, that is, the signal output frequency can be set to the same as the image pickup device which does not carry out the broad dynamic range image pickup operation, so that increase of power consumption and deterioration of SN ratio can be prevented. In addition, no discontinuous timing pulse rises up during the horizontal picture period, and thus the vertically striped system noise can be prevented from occurring.

Figure 6:
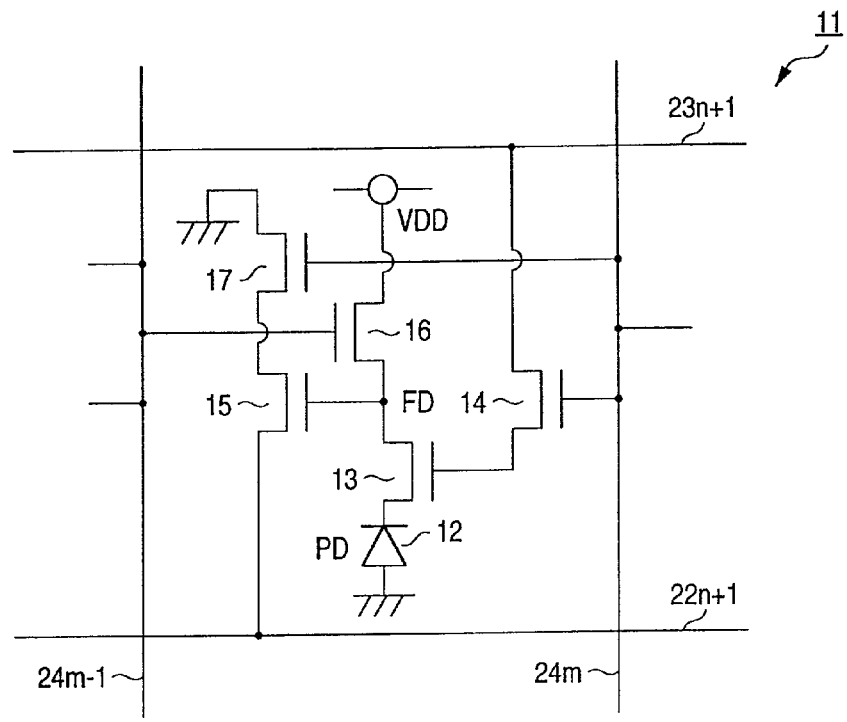
FIG. 6 is a circuit diagram showing another construction of a unit pixel.

In this embodiment, the drain of the amplifying transistor 15 is connected to the power source VDD and the source thereof is connected through the output selection transistor 17 to the horizontal signal line 22n+1 in the unit pixel 11. However, as shown in FIG. 6, the unit pixel 11 may be designed in accordance with the construction of the I-V conversion circuits 37, 38 so that the drain of the amplifying transistor 15 is connected to the horizontal signal line 22n+1 and the source thereof is connected through the output selection transistor 17 to GND.

The long-time accumulation signal and the short-time accumulation signal are output, and an image pickup signal having contrast to the incident light amount in a broad range is obtained on the basis of these signals. That is, in order to implement the broad dynamic range image pickup operation, the signals on the same row are used as the long-time accumulation signal and the short-time accumulation signal. On the other hand, the long-time accumulation signal and the short-time accumulation signal which are simultaneously output through the two vertical signal lines 25, 26 are signals on different rows.

With respect to the same row, as is apparent from the above description on the operation, the long-time accumulation signal is output at the time t2, and the short-time accumulation signal is output at the time t3. That is, there is a time difference of t3–t2 between the long-time accumulation signal and the short-time accumulation signal on the same row. Accordingly, in order to implement the broad dynamic range image pickup operation, the long-time accumulation signal and the short-time accumulation signal on the same row are required to be made simultaneous with each other.

Figure 7:
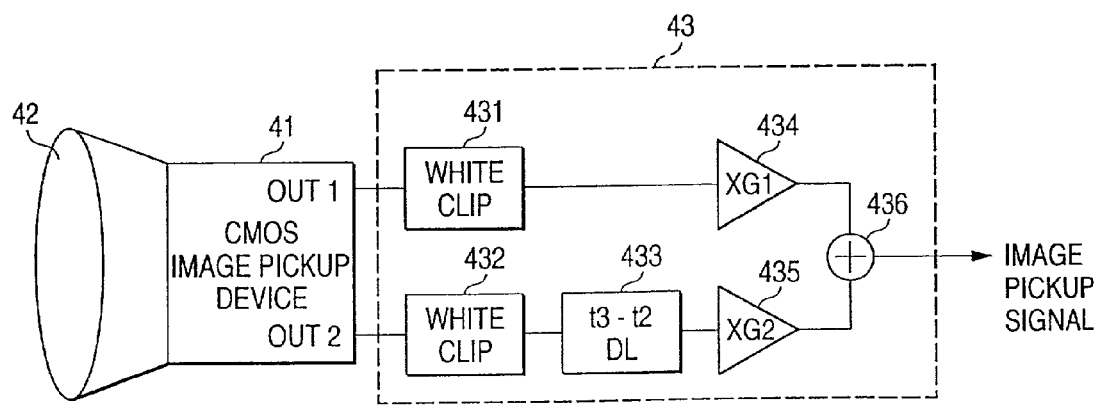
FIG. 7 is a block diagram showing an example of the construction of a camera system according to the present invention.

FIG. 7 shows an example of the construction of a camera system according to the present invention which is equipped with a signal processing system for satisfying the above requirement.

As is apparent from FIG. 7, the camera system according to the present invention comprises a CMOS image pickup device 41, an optical system containing a lens 42 and a signal processing circuit 43. In the camera system thus constructed, a CMOS image pickup device according to the above embodiment or a modification thereof is used as the CMOS image pickup device 41. The lens 42 focuses incident light (image light) from a subject (not shown) onto the imaging face of the CMOS image pickup device 41. On the basis of the image light focused on the imaging face, the CMOS image pickup device 41 outputs the short-time accumulation signal as the output OUT1 and the long-time accumulation signal as the output OUT2.

The signal processing circuit 43 comprises two white clip circuits 431, 432, a single delay circuit 433, two amplifiers 434, 435 and a single adder 436. In the signal processing circuit 43, the two white clip circuits 431, 432 perform the processing of clipping the outputs OUT1, OUT2 of the CMOS image pickup device 41, that is, the short-time accumulation signal a and the long-time accumulation signal b by the white clip level (see FIG. 5) and making the dispersion of the saturation level of the respective pixels uniform.

The delay circuit 433 has a delay time of t3–t2, and delays the long-time accumulation signal b to make the long-time accumulation signal b simultaneous with the short-time accumulation signal a. The amplifiers 434, 435 have gains G1, G2 respectively, and amplify the short-time accumulation signal a and the long-time accumulation signal b respectively. The adder 436 adds the short-time accumulation signal a and the long-time accumulation signal b which are made simultaneous with each other and amplified, thereby obtaining a signal of a×G1+b×G2, that is, an image pickup signal having contrast to a broad-range incident light amount.

As described above, the CMOS image pickup device 41 which can output the short-time accumulation signal a and the long-time accumulation signal b separately from each other is used as the image pickup device. In addition, the short-time accumulation signal a and the long-time accumulation signal b on the same row which are output from the CMOS image pickup device 41 are made simultaneous with each other, and then processed, thereby implementing the broad dynamic range image pickup operation without inducing any vertically striped system noise.

Further, when the gain G2 of the amplifier 435 is set to zero in the signal processing circuit 43, only the short-time accumulation signal a is output as the image pickup signal, and thus an electronic shutter operation having an accumulation time of t3–t2 is carried out. That is, in the camera system according to the present invention which uses the CMOS image pickup device according to the above embodiment or modification thereof as the image pickup device, the broad dynamic range image pickup operation and the electronic shutter operation can be selectively performed by switching the gain G2 of the amplifier 435.

The CMOS image pickup device according to the above-described embodiment is designed so that the vertical signal lines, the selection transistors and the vertical scan circuits of two systems are respectively provided, however, the number of systems in which the above parts are respectively provided is not limited to two. That is, the above parts may be respectively provided in each of three or more systems.

In this case, various input/output characteristics can be obtained by arbitrarily setting the ratio of read-out timings t1: t2: t3: . . . at which signals are read out from the respective pixels, the delay amount of the delay circuit (delay time) and the gains of the operating units G1, G2, G3, . . .

Figure 8:
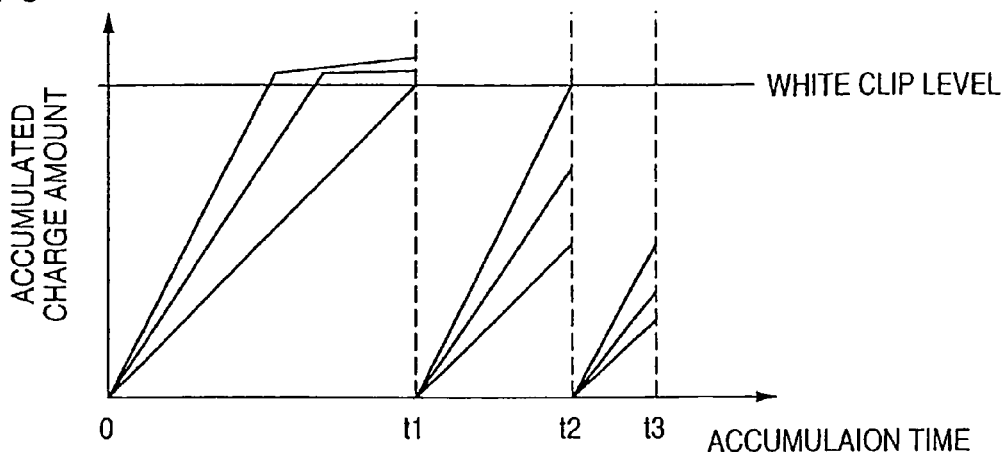
FIG. 8 is a diagram showing the time variation of the pixel accumulated charge amount when the vertical driving system is a triple system.
Figure 9:
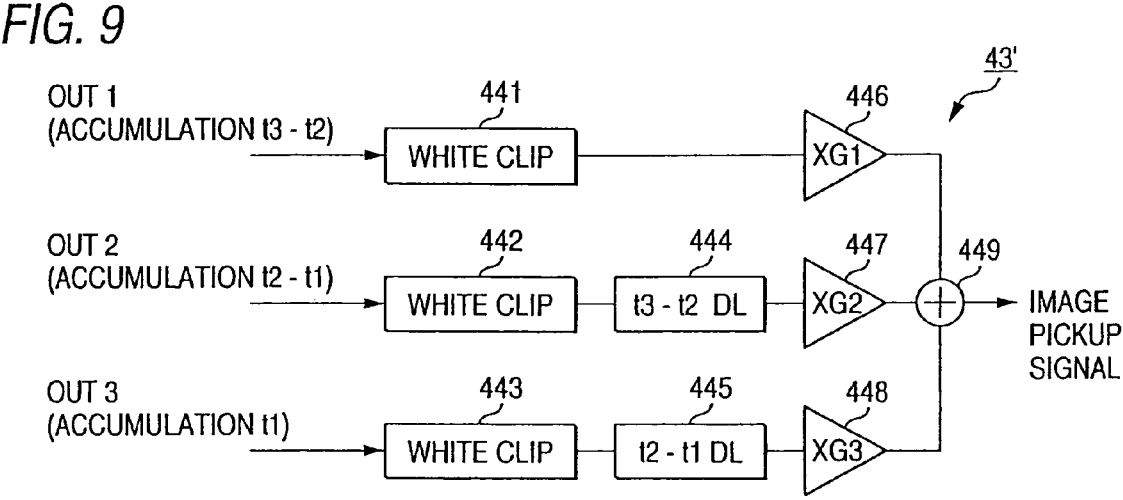
FIG. 9 is a block diagram showing the construction of a signal processing circuit when the vertical driving system is a triple system.

Here, there will be described such a case that the vertical signal lines, the vertical selection transistors and vertical scan circuits are provided for each of respective three systems. FIG. 8 shows the relationship between the accumulation time and the accumulation charge amount of the pixel, and FIG. 9 shows the construction of a signal processing circuit 43' of a camera system in this case.

The signal processing circuit 43' comprises three white clip circuits 441, 442, 443, two delay circuits 444, 445, three amplifiers 446, 447, 448 and a single adder 449.

In the signal processing circuit 431 thus constructed, the three white clip circuits 441, 442, 443 clip the outputs OUT1, OUT2, OUT3 of the three systems of the CMOS image pickup device, that is, the respective signals of the accumulation time (t3−t2), (t2−t1), t1 by the white clip level (see FIG. 8) to make uniform the dispersion in the saturation level of the respective pixels.

The delay circuit 444 and the delay circuit 445 have a delay time of t3−t2 and a delay time of t2−t1 respectively, and delay the respective signals of the accumulation time t2−t1, t1, whereby the signals of the accumulation time t2−t1, t1 are made simultaneous with the signal of the accumulation time t3−t2. The amplifiers 446, 447, 448 have gains G1, G2, G3, and amplify the respective signals of the accumulation time t3−t2, t2−t1, t1. The adder 449 adds the respective signals which are made simultaneous with one another and amplified, thereby obtaining an image pickup signal having contrast to a broad-range incident light amount.

Figure 10:
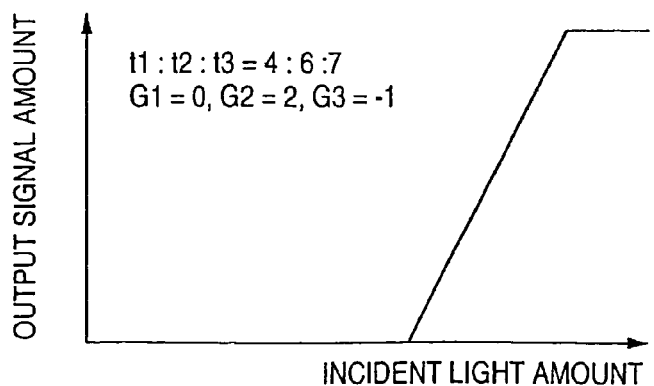
FIG. 10 is an input/output characteristic diagram showing the relationship between an incident light amount and an output signal amount when the vertical driving system is a triple system.

As an example, by setting the ratio of the read-out timing of the signal from each pixel to t1:t2:t3=4:6:7 (accumulation time ratio 4:2:1) and setting the gains G1, G2 and G3 of the operating portion (amplifiers 446, 447, 448) to 0, 2 and −1 respectively, only a specific light amount portion can be picked up (that is, black clip+white clip). FIG. 10 shows an input/output characteristic at this time.

In the case of the CMOS image pickup device of the above-described embodiment, the high-speed image pickup operation can be also supported by varying the driving timing. In the following description, an embodiment in which the high-speed image pickup operation can be supported will be described.

Figure 11:
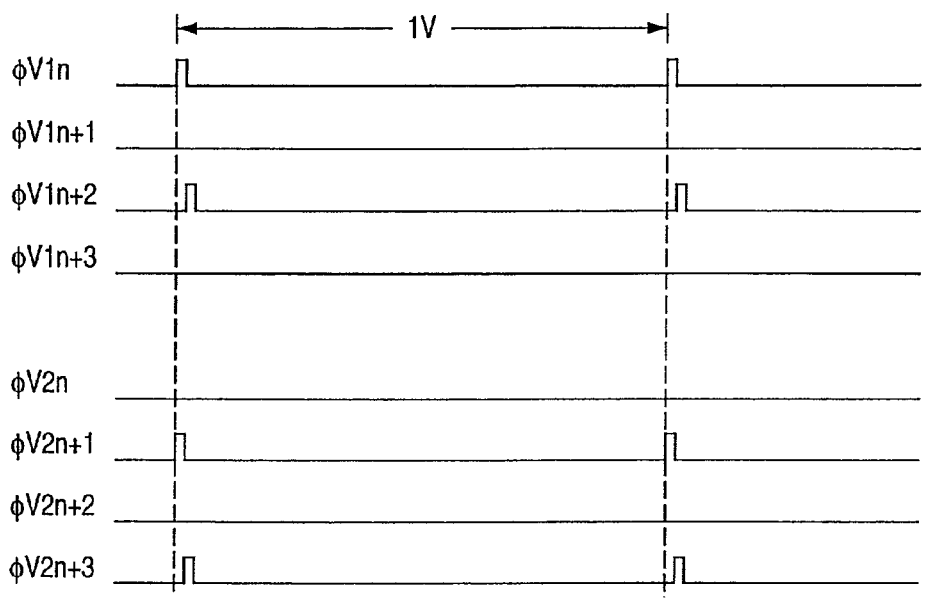
FIG. 11 is a timing chart of the vertical scan operation in a high-speed image pickup operation.

In the construction shown in FIG. 1, the first vertical scan circuit 30 is put in charge of odd-number rows and the second vertical scan circuit 31 is put in charge of even-number rows as shown in the timing chart of FIG. 11. That is, the vertical scan operation is carried out while skipping every other row so that the vertical scan pulses of the odd-number rows ( . . . , φV1n, φV1n+2, . . . ) are output from the first vertical scan circuit 30, and the vertical scan pulses of the even-number rows ( . . . , φV2n+1, φV2n+3, . . . ) are output from the second vertical scan circuit 31.

Figure 12:
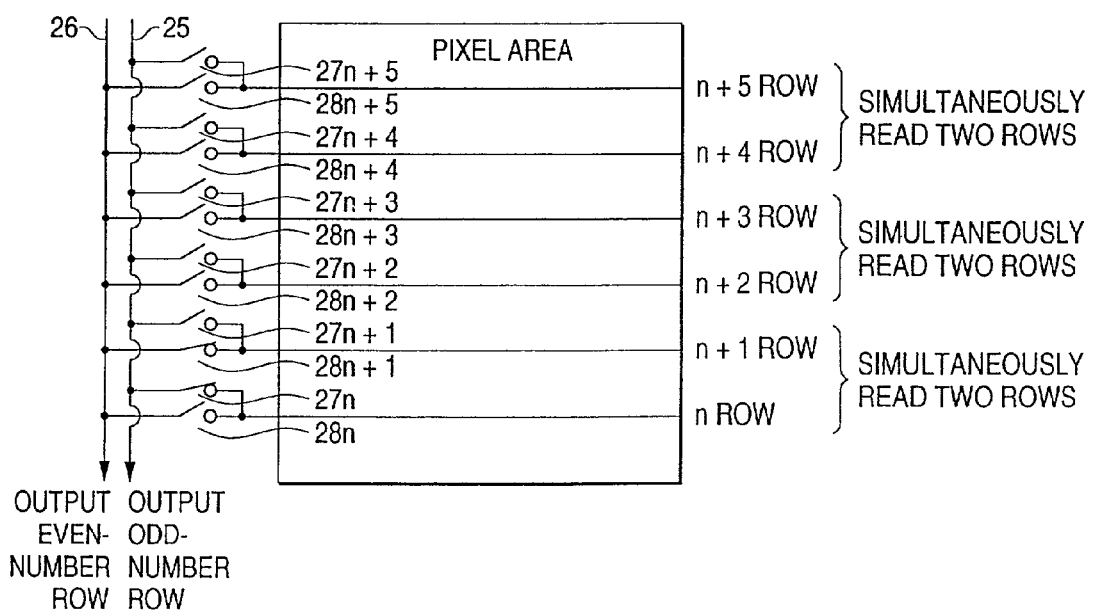
FIG. 12 is a schematic diagram showing the vertical scan operation in the high-speed image pickup operation.
Figure 13:
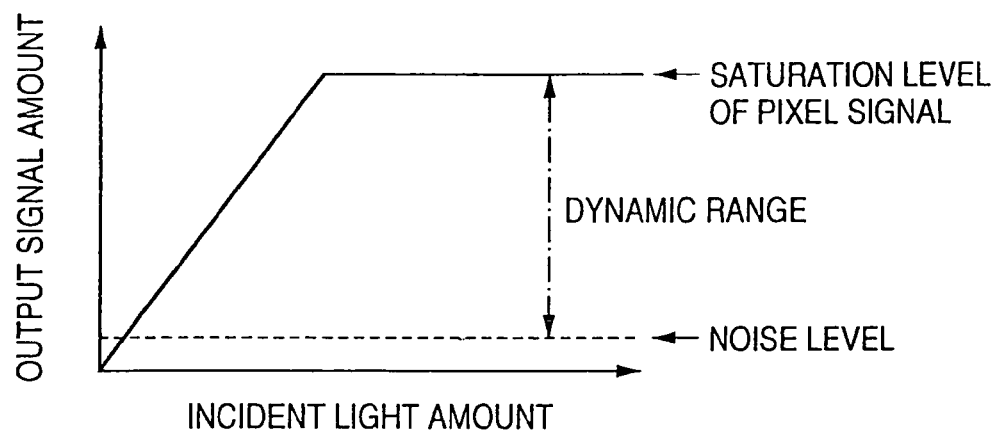
FIG. 13 is an input/output characteristic diagram showing the relationship between the incident light amount and the output signal amount of the image pickup device.

Accordingly, as shown in the schematic diagram of FIG. 12, signals of two rows can be simultaneously read out through the vertical selection transistors ( . . . , 27n, 27n+2, . . . ), ( . . . , 28n+1, 28n+3, . . . ) and the vertical signal lines 25, 26. As a result, the information of all the pixels can be picked up in half a time at the same operating frequency, thereby implementing the high-speed image pickup operation.

In this case, the high-speed image pickup operation of the CMOS image pickup device in which the vertical signal lines, the vertical selection transistors and the vertical scan circuits are provided for two systems is described. However, if the number of systems may be increased to three systems, four systems, etc., the information of all the pixels can be picked up in one-third time, one-fourth time, etc., and thus higher-speed image pickup operation can be implemented.

In order to fabricate the CMOS image pickup device which can support only high-speed image pickup operation, if vertical start pulses of n are given to the vertical scan circuit to perform the vertical scan operation while skipping every (n−1) rows, only one vertical scan circuit is sufficient although the vertical selection transistors and the vertical signal lines of n systems are provided.

The construction of the unit pixel according to the above embodiment and the modification is merely an example, and thus the present invention is not limited to the embodiment and the modification. That is, the present invention is applicable to general X-Y address type solid-stage image pickup devices in which each unit pixel has at least a photoelectric conversion element such as a photodiode or the like, a read-out transistor for reading out the accumulated charges thereof and a read-out selection transistor for selecting the read-out transistor.

As described above, according to the present invention, in the solid-state image pickup device designed so that the signal corresponding to the accumulated charge amount of each pixel is output to the horizontal signal lines wired on a row basis and the camera system using the solid-state image pickup device as an image pickup device, plural vertical signal lines are provided in connection with each horizontal signal lines, and plural systems of vertical driving systems are disposed in connection with the vertical signal lines, whereby plural signals which are different in accumulation time and obtained by dividing 1 field into any number of parts with any integer times of 1H can be separately output, so that the broad dynamic range image pickup operation can be implemented without inducing any vertically striped system noise.

What is claimed is:

1. A solid-state image pickup device comprising:
   a pixel portion in which unit pixels are arranged in a matrix form;
   horizontal signal lines of plural rows which are wired to said pixel portion on a row basis;
   plural vertical signal lines which are wired commonly to said horizontal signal lines of plural rows;
   vertical driving means of plural systems which select the respective pixels of said pixel portion every row over plural different rows, making the accumulation time of signal charges of each pixel of the plural selected rows different among the plural rows, and successively outputting to said plural vertical signal lines the signals which are output from the respective pixels to said horizontal signal lines of plural rows; and
   horizontal driving means for successively selecting the pixels of plural rows which are selected by said plural systems of vertical driving means; wherein
   each of said unit pixels comprises a photoelectric converter, a read-out transistor for reading out a signal charge, accumulated by said photoelectric converter, into a storage unit, a read-out selection transistor for selecting the reading out of the signal charge by said read-out transistor, an amplifying transistor for converting the signal charge stored in said storage unit into an electrical signal and for outputting the electrical signal as a pixel signal, a reset transistor for resetting the storage unit, and an output selection transistor for selecting the output of the pixel signal provided by said amplifying transistor a read out transistor and an output selection transistor; and said horizontal driving means feeds a horizontal selection pulse to said read out selection transistor and said output selection transistor.

2. The solid-state image pickup device as claimed in claim 1, wherein said vertical driving means of plural systems has vertical selection switches of plural systems which are connected between each of said horizontal signal lines of plural rows and said plural vertical signal lines, and plural vertical scan circuits which are provided in connection with said vertical selection switches of plural systems and successively drive said vertical selection switches of different rows by a vertical scan operation.

3. A solid-state image pickup device as claimed in claim 1, wherein said horizontal selection pulse also serves as a reset pulse for an adjacent column of said unit pixels.

4. A method of driving a solid-state image pickup device comprising a pixel portion in which unit pixels are arranged in a matrix form, each pixel comprises a photoelectric converter a read-out transistor for reading out a signal charge, accumulated by said photoelectric converter, into a storage unit, a read-out selection transistor for selecting the reading out of the signal charge by said read-out transistor, an amplifying transistor for converting the signal charge stored in said storage unit into an electrical signal and for outputting the electrical signal as a pixel signal, a reset transistor for resetting the storage unit, and an output selection transistor for selecting the output of the pixel signal provided by said amplifying transistor, horizontal signal lines of plural rows which are wired to the pixel portion on a row basis, and plural vertical signal lines which are wired commonly to the horizontal signal lines of plural rows, characterized by the steps of:

selecting the respective pixels of the pixel portion every row over plural different rows;

making the accumulation time of signal charges of each pixel of the plural selected rows different among the plural rows;

successively selecting the respective pixels of plural rows thus selected and outputting the signal of each pixel to the corresponding one of the horizontal signal lines of plural rows;

outputting through the plural vertical signal lines the signals which are output from the respective pixels to the horizontal signal lines; and feeding a horizontal selection pulse to said read out selection transistor and said output selection transistor.

5. A camera system using as an image pickup device a solid-state image pickup device wherein said solid-state image pickup device comprises:

a pixel portion in which unit pixels are arranged in a matrix form;

horizontal signal lines of plural rows which are wired to said pixel portion on a row basis;

plural vertical signal lines which are wired commonly to said horizontal signal lines of plural rows;

vertical driving means of plural systems which select the respective pixels of said pixel portion every row over plural different rows, making the accumulation time of signal charges of each pixel of the plural selected rows different among the plural rows, and successively outputting to said plural systems of vertical driving means the signals which are output from the respective pixels to said horizontal signal lines of plural rows; and horizontal driving means for successively selecting the pixels of plural rows which are selected by said plural systems of vertical driving means; wherein each of said unit pixels comprises a photoelectric converter, a read-out transistor for reading out a signal charge, accumulated by said photoelectric converter, into a storage unit, a read-out selection transistor for selecting the reading out of the signal charge by said read-out transistor, an amplifying transistor for converting the signal charge stored in said storage unit into an electrical signal and for outputting the electrical signal as a pixel signal, a reset transistor for resetting the storage unit, and an output selection transistor for selecting the output of the pixel signal provided by said amplifying transistor; and said horizontal driving scans feeds a horizontal selection pulse to said read out selection transistor and said output selection transistor.

6. The camera system as claimed in claim 5, further comprising a signal processing circuit containing delay means for making signals of plural different rows output from said solid-state image pickup device simultaneous with one another, and processing means for processing the signals of plural rows which are made simultaneous with one another by said delay means.

7. A solid-state image pickup device comprising:

a pixel portion in which unit pixels are arranged in a matrix form;

horizontal signal lines of plural rows which are wired to said pixel portion on a row basis;

a vertical line which is wired commonly to said horizontal signal lines of plural rows;

vertical driving means for selecting the pixels of said pixel portion wired to the respective row of said horizontal signal line; and horizontal driving means for selecting the pixel of the row selected by said vertical driving means; wherein each of said unit pixels comprises a photoelectric converter, a read-out transistor for reading out a signal charge, accumulated by said photoelectric converter, into a storage unit, a read-out selection transistor for selecting the reading out of the signal charge by said read-out transistor, an amplifying transistor for converting the signal charge stored in said storage unit into an electrical signal and for outputting the electrical signal as a pixel signal, a reset transistor for resetting the storage unit, and an output selection transistor for selecting the output of the pixel signal provided by said amplifying transistor;

said vertical driving means successively outputs the pixel signals to said vertical line via said horizontal signal line; and said horizontal driving means feeds a horizontal selection pulse to said read out selection transistor and said output selection transistor.

8. A solid-state image pickup device as claimed in claim 7, wherein said unit pixel outputs a reset level by said reset transistor during a reset operation and a signal level based on the signal charge photoelectrically converted by said photoelectric converter.

9. A solid-state image pickup device as claimed in claim 7, the device further comprises a circuit for determining a difference between the reset level and the signal level.

10. A solid-state image pickup device as claimed in claim 9, wherein said circuit is a correlated double sampling circuit.

11. A solid-state image pickup device as claimed in claim 7, the device further comprises means for outputting signals of different accumulation time periods.

12. A solid-state image pickup device as claimed in claim 7, wherein said horizontal selection pulse also serves as a reset pulse for an adjacent column of said unit pixels.

13. A method for driving a solid-state image pickup device comprising:

a pixel portion having a matrix of unit pixels, each unit pixel comprises a photoelectric converter, a read out transistor for reading out a signal charge, accumulated by said photoelectric converter, into a storage unit, a read out selection transistor for selecting the reading out of the signal charge by said read out transistor, an amplifying transistor for converting the signal charge stored in said storage unit into an electrical signal and for outputting the electrical signal as a pixel signal, a reset transistor for resetting said storage unit, and an output selection transistor for selecting the output of the pixel signal provided by said amplifying transistor, horizontal signal lines of plural rows which are wired to said pixel portion on a row basis, a vertical line which is wired commonly to said horizontal signal lines of plural rows, vertical driving means for selecting the pixels of said pixel portion wired to the respective row of said horizontal signal line, and horizontal driving means for selecting the pixel of the row selected by said vertical driving means, the method comprising the steps of:

resetting a storage unit by a reset transistor;

outputting a reset level of said reset transistor to a horizontal signal line through an amplifying transistor;

reading out the signal charge of the photoelectric converter into said storage unit;

outputting a signal level based on the signal charge to said horizontal signal line through said amplifying transistor;

outputting the reset level and the signal level to a vertical line through said horizontal signal line sequentially; and feeding a horizontal selection pulse from said horizontal driving means to said read out selection transistor and said output selection transistor.

* * * * *

UNITED STATES PATENT AND TRADEMARK OFFICE
CERTIFICATE OF CORRECTION

PATENT NO.       : 6,975,357 B1
APPLICATION NO. : 09/830515
DATED            : December 13, 2005
INVENTOR(S)      : Ryoji Suzuki Page 1 of 1

It is certified that error appears in the above-identified patent and that said Letters Patent is hereby corrected as shown below:

Title Page:
Item (30) should be read as follows:
*(30)    Foreign Application Priority Data*
Nov. 30, 1999 (JP)                 11-242665

Signed and Sealed this

Fifth Day of September, 2006

JON W. DUDAS
*Director of the United States Patent and Trademark Office*